(12) United States Patent
Wyatt et al.

(10) Patent No.: US 7,050,071 B2
(45) Date of Patent: May 23, 2006

(54) LAYERED ROTATIONAL GRAPHICS DRIVER

(75) Inventors: David Wyatt, San Jose, CA (US); Malayala R. Srinivasan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 10/452,167

(22) Filed: May 30, 2003

(65) Prior Publication Data

US 2004/0239690 A1 Dec. 2, 2004

(51) Int. Cl.
G09G 5/38 (2006.01)
G06T 3/60 (2006.01)

(52) U.S. Cl. ..................................... 345/649
(58) Field of Classification Search ................ 345/649, 345/656–659; 348/583; 382/296, 297
See application file for complete search history.

(56) References Cited

U.S. PATENT DOCUMENTS 5,973,664 A 10/1999 Badger 6,400,851 B1 * 6/2002 Shih ........................... 345/659
2004/0052431 A1 * 3/2004 Locker et al. .............. 382/296

OTHER PUBLICATIONS

Jim Gettys and Keith Packard, The X Resize and Rotate Extension—RandR, Usenix Technical Conference 2001, pp. 1-9.*

* cited by examiner

*Primary Examiner*—Jeffery A. Brier
(74) *Attorney, Agent, or Firm*—Blakely, Sokoloff, Taylor & Zafman LLP

(57) ABSTRACT

A method and apparatus for a layered rotational graphics driver are described. A rotation driver is loaded. The rotation driver is layered between a graphics device interface and a display driver. The rotation driver allocates a first memory space and the display driver allocates a second memory space. An image is rendered into the first memory space. The image has a first orientation within the first memory space. The image is rotated from the first memory space into the second memory space. The image has a second orientation within the second memory space. The image is displayed in the second orientation from the second memory space.

27 Claims, 8 Drawing Sheets

Landscape 0°
118

Portrait 90°
120

Inverted Landscape 180°
122

Inverted Portrait 270°
124

Graphics Driver Stack - Landscape

Graphics Driver Stack - Layered Rotation Driver

LAYERED ROTATIONAL GRAPHICS DRIVER

TECHNICAL FIELD

This disclosure relates generally to computer displays and specifically to rotation of computer displays.

BACKGROUND INFORMATION

Computer displays typically are constructed in a manner to display text and other video information in a landscape mode. There have been some displays that are constructed to display video data in portrait mode. To bridge the gap between the two modes of displays, some have built software drivers to enable a display to be rotated between landscape and portrait mode (e.g. typically 90° or 270°) and then to trigger a software switch (either automatically or under user-controlled input) in order to render the image "right-side up."

One approach has been to provide a display driver which uses a back buffer and a front buffer. The back buffer is a memory surface which has an orientation which is natural for the hardware, while the front buffer is in the natural orientation of the display device. The back buffer is an opaque surface, which forces the graphics device interface to call through to the display driver. The graphics device interface renders the desktop to the back buffer, while the front buffer is used to satisfy the display refresh. The driver then updates the front buffer using the back buffer contents using a rotating bit block transfer function.

Conventional rotation systems have the disadvantage that an existing display driver must be replaced by a new driver to support a rotated display. Development of a full display driver which supports a rotated display requires extensive effort and validation, since the driver would need to perform graphical operations in rotated form. Furthermore, some conventional drivers rotate each graphical primitive on the fly as it is rendered into the frame buffer. This approach results in the disadvantage that the pixels of the frame buffer are stored in a rotated orientation, which compromises compatibility with most applications that only understand pixels in the traditional unrotated landscape organization. Although the organization of the pixels in the buffer remains the same, the image contents are rotated. The result is that applications and the operating system, which typically access the contents of the frame buffer, will have difficulty in interpreting the rotated format of the contents of the frame buffer. To overcome this compatibility problem, the contents of the frame buffer would have to be converted to an unrotated format before an application could access the contents.

DETAILED DESCRIPTION

In the following detailed description of embodiments of the invention, reference is made to the accompanying drawings in which like references indicate similar elements, and in which, by way of illustration, specific embodiments in which the invention may be practiced are shown. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
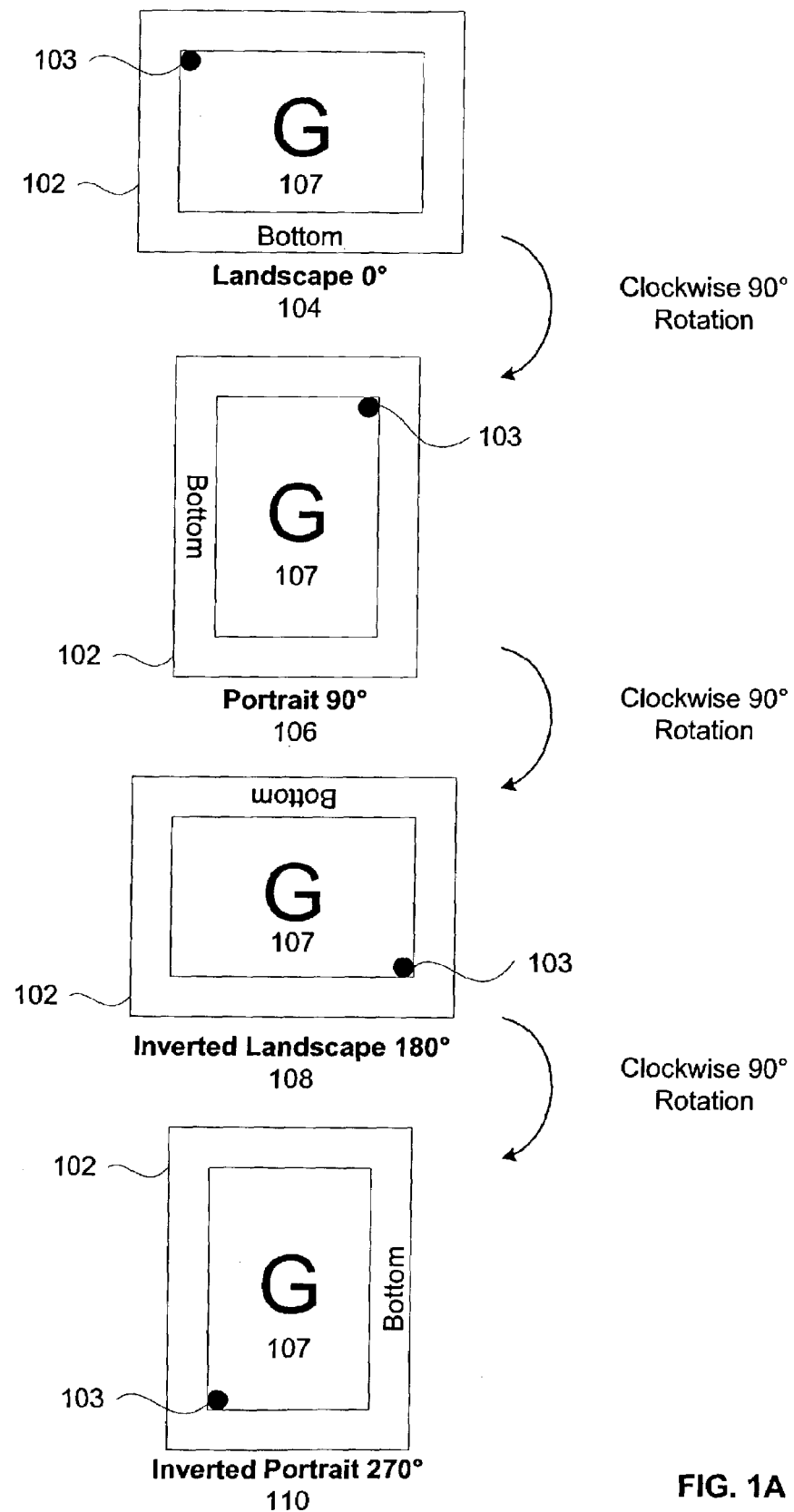
FIG. 1A illustrates an embodiment of rotation of a display device.

FIG. 1A illustrates an embodiment of rotation of a display device 102. In one embodiment, display device 102 is a graphical display device which displays pixels organized into scan lines, which are displayed sequentially filling the screen. The display device 102 scans out the pixels into lines beginning from a physical origin 103, typically in a left to right manner. The scan lines are typically painted sequentially from top to bottom. In one embodiment, no. modification is required to the scan line logic of the graphics controller or display device to display the image in a rotated orientation. In one embodiment, the display device provides Plug and Play information which is exported through a digital extension block, as defined within the VESA DI-EXT standard (Video Electronics Standards Association Display Information Extension Block Standard, August 2001), which includes fields identifying the scan direction and display orientation through the display device's VESA DDC (Display Data Channel) interface. Display device 102 is typically oriented in a landscape format 104 in which the screen image is wider than it is tall. In one embodiment, display device 102 can be rotated about an axis that is substantially perpendicular to the plane of the display screen. In one embodiment, the display device is integrated with a computer system, such as, for example, an LCD (Liquid Crystal Display) screen on a laptop device, or a display device on a tablet computer, such as a TabletPC. Therefore, reference to rotating the display device should not be construed as limiting embodiments of the invention only to display devices that rotate, but instead should be interpreted as including any display device on which a rotated image may be displayed.

From the landscape format 104, the display device 102 may be rotated 90° clockwise into a portrait format 106, 180° clockwise into an inverted landscape format 108, and 270° clockwise into an inverted portrait format 110. It will be appreciated that the display device 102 may be rotated into other orientations and angles. In one embodiment, the physical origin 103 remains the same for the display device 102 in each orientation of the display device. In one embodiment, for an image 107 to appear upright on a rotated display device 102, the image sent to the display device needs to be modified or rotated.

Figure 1B:
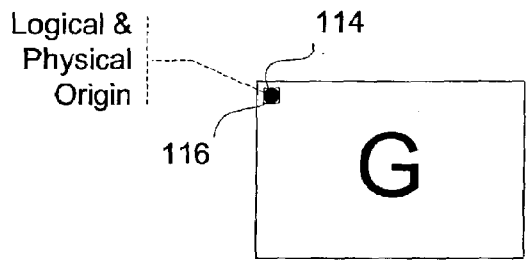
FIG. 1B illustrates an embodiment of pixels in a frame buffer.
Figure 1B:
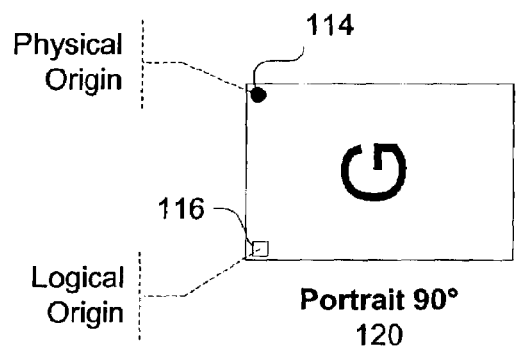
Figure 1B:
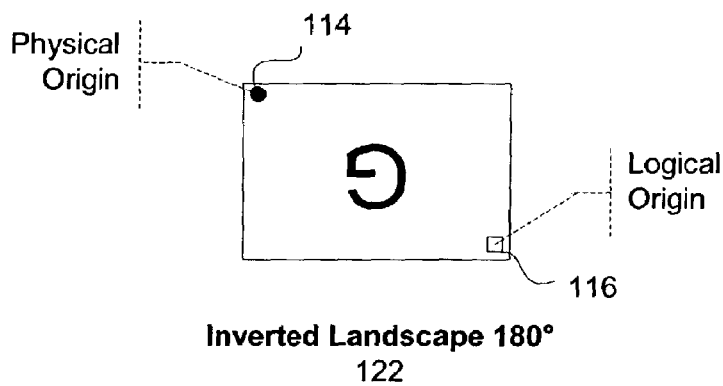
Figure 1B:
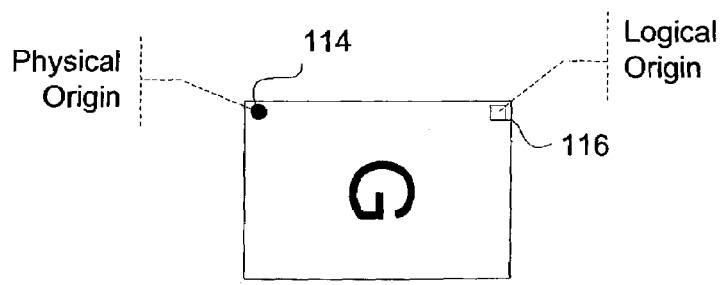

FIG. 1B illustrates an embodiment of pixels in a real frame buffer. In one embodiment, the orientation of the pixels of the real frame buffer is reorganized from a normal landscape orientation 118 to accommodate a rotated orientation of the display device. In one embodiment, the display device's scan direction does not change between orientations. Thus, in one embodiment, when the display device is rotated 90° clockwise into a portrait orientation 120, the top left corner of the screen from a viewer's perspective (i.e. "logical origin" 116) is located at a point other than the first pixel on the first scan line of the display device (i.e. "physical origin" 114). Likewise, the logical origin 116 is located at a different point than the physical origin 114 when the display device is rotated into the inverted landscape 122 or inverted portrait 124 orientations.

Figure 2:
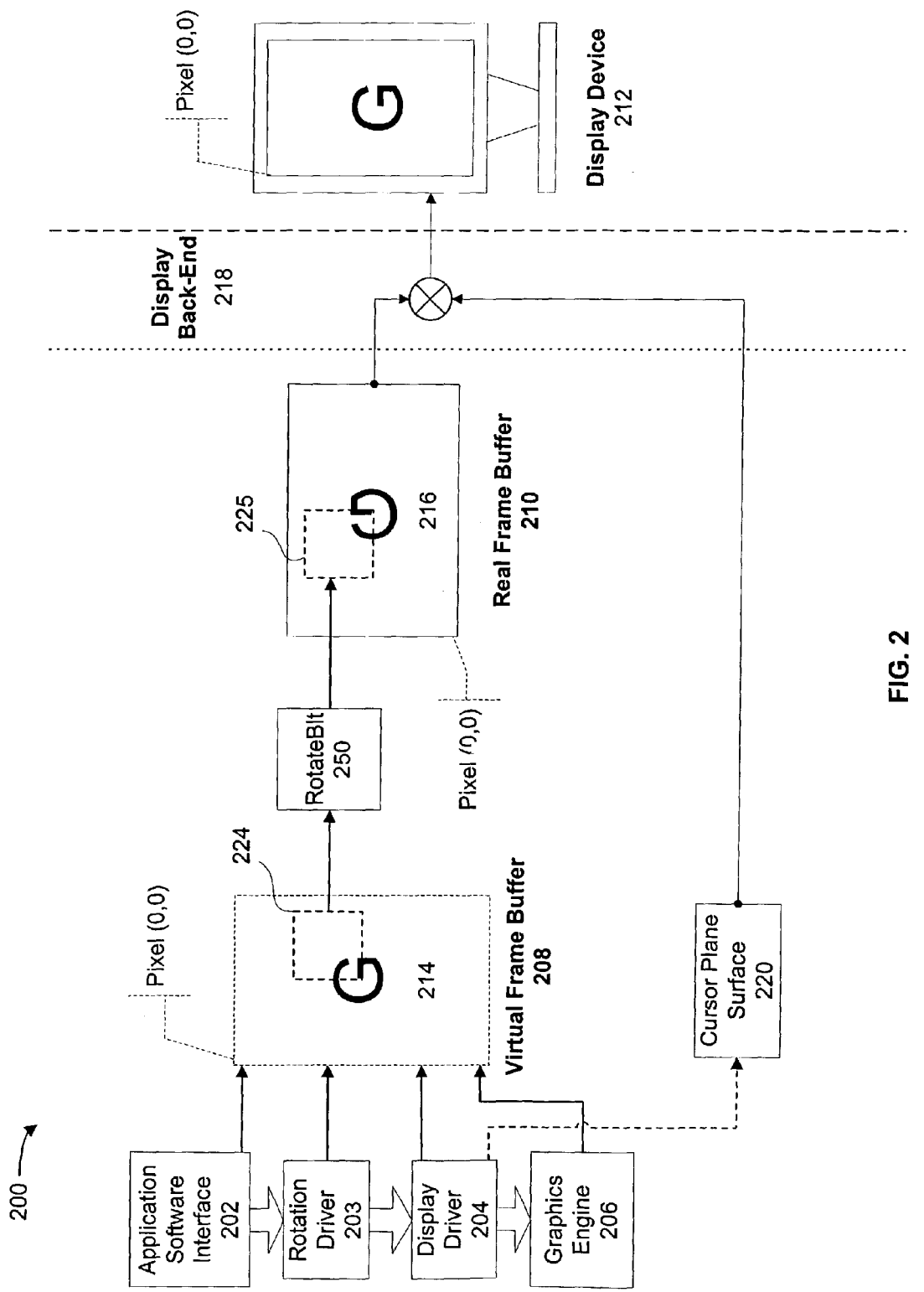
FIG. 2 illustrates an embodiment of a rotation system.

FIG. 2 illustrates an embodiment of a rotation system 200. Rotation system 200 includes application software interface 202, rotation driver 203, display driver 204, graphics engine 206, Virtual Frame Buffer (VFB) 208, Real Frame Buffer (RFB) 210, and rotated display device 212. Application software interface 202 calls rotation driver 203 for accelerated rendering through hardware. Rotation driver 203 loads display driver 204.

Display driver 204 creates RFB 210. In one embodiment, RFB 210 is a memory surface which contains pixels in a rotated organization for display. In one embodiment, the display driver 204 creates RFB 210 by allocating memory. In one embodiment, RFB 210 is the display plane surface, and pixels stored in RFB 210 are displayed in a rotated orientation on display device 212. Display driver 204 manages rendering of graphics primitives on a graphics controller device which displays memory surfaces containing pixels on the display device 212. In one embodiment, the graphics controller has a texture processor in its 3D engine.

In one embodiment, the display driver 204 provides functionality for rotating a surface to a destination in a requested orientation. In one embodiment, the display driver 204 provides functionality for rotating a surface by at least 90°, 180°, and 270°. It will be appreciated that functionality for rotating a surface into other orientations and angles may be provided. In one embodiment, the rotation functionality is provided through a function which provides bit block transfer capabilities, which is referred to herein as a "Rotate-Blt" operation. In one embodiment, the rotation functionality is provided by an optimized version of the RotateBlt function, which reuses the DrvPlgBlt (a parallelogram bit block transfer function) interface present in the existing Display Driver interface. The DrvPlgBlt function provides rotate bit-block transfer capabilities between combinations of device-managed and graphics device interface managed surfaces.

Rotation driver 203 creates the VFB 208. In one embodiment, the rotation driver 203 creates the VFB 208 by allocating memory. In one embodiment, the VFB 208 is registered as the primary display surface. The VFB 208 is a memory surface that stores an unrotated image 214. The unrotated image 214 is rendered into the VFB 208 through conventional top-to-bottom, left-to-right rasterized rendering. The use of the VFB 208 provides software and hardware rendering compatibility, since it is registered as the primary display surface. In one embodiment, the VFB 208 provides compatibility with existing landscape display drivers, applications, and operating systems by providing a frame buffer in a format that can be conventionally interpreted. In one embodiment, the VFB 208 contents are in a conventional landscape organization. In one embodiment, although the pixels of the VFB 208 are in a conventional landscape organization, the VFB 208 is in an aspect ratio that corresponds to the orientation of the rotated display, e.g. portrait mode.

Since the VFB 208 is organized in a format that a conventional landscape driver can interpret, the existing landscape display driver does not need to be replaced by a new portrait driver. Instead, through using a layered rotation driver 203, the conventional display driver 204 may be leveraged into performing its normal operations into the VFB 208 instead of the RFB 210, and then later rotating the contents of the VFB 208 into the RFB 210 in the appropriate orientation.

The display driver 204 renders into a region 224 of the VFB 208. In one embodiment, using the rotation functionality 250, the region 224 of the VFB 208 is rotated into a corresponding region 225 in the RFB 210 in the appropriate orientation (e.g. 90°, 180°, or 270° from the orientation in the VFB 208). The contents of the RFB 210 are blended with a cursor plane surface 220 by the display back-end 218, and displayed on the rotated display device 212 in a rotated orientation.

In one embodiment, since the applications and operating systems access the VFB 208 instead of the RFB 210, the contents of the RFB 210 may be stored in a different or optimized format compared to the format of the contents of the VFB 208. The memory footprint and memory bandwidth may be reduced by storing the contents of the RFB 210 in a more efficient format. In one embodiment, the contents of the RFB 210 are stored in a memory-efficient byte-swizzled format (tiled according to DRAM page/row/column organization). In one embodiment, the contents of the RFB 210 are stored in a lossless compressed format, e.g. Run-Length Encoding, such as that used in S3/Microsoft's DXTC (DirectX Texture Compression) format or Compuserve GIF (Graphics Interchange Format) format. In one embodiment, the contents of the RFB 210 are stored in an alpha-compressed pixel format, e.g. from ARGB (Alpha Red Green Blue) to RGB (Red Green Blue). In one embodiment, the contents of the RFB 210 are stored in a compressed pixel format, e.g. from 32 bit xRGB to 24 bit RGB. In one embodiment, the contents of the RFB 210 are stored in a lossy compressed format. In one embodiment, the contents of the RFB 210 are stored in a lower color depth than the VFB 208. Other formats or methods may be used for storing pixels in the RFB 210.

Figure 3:
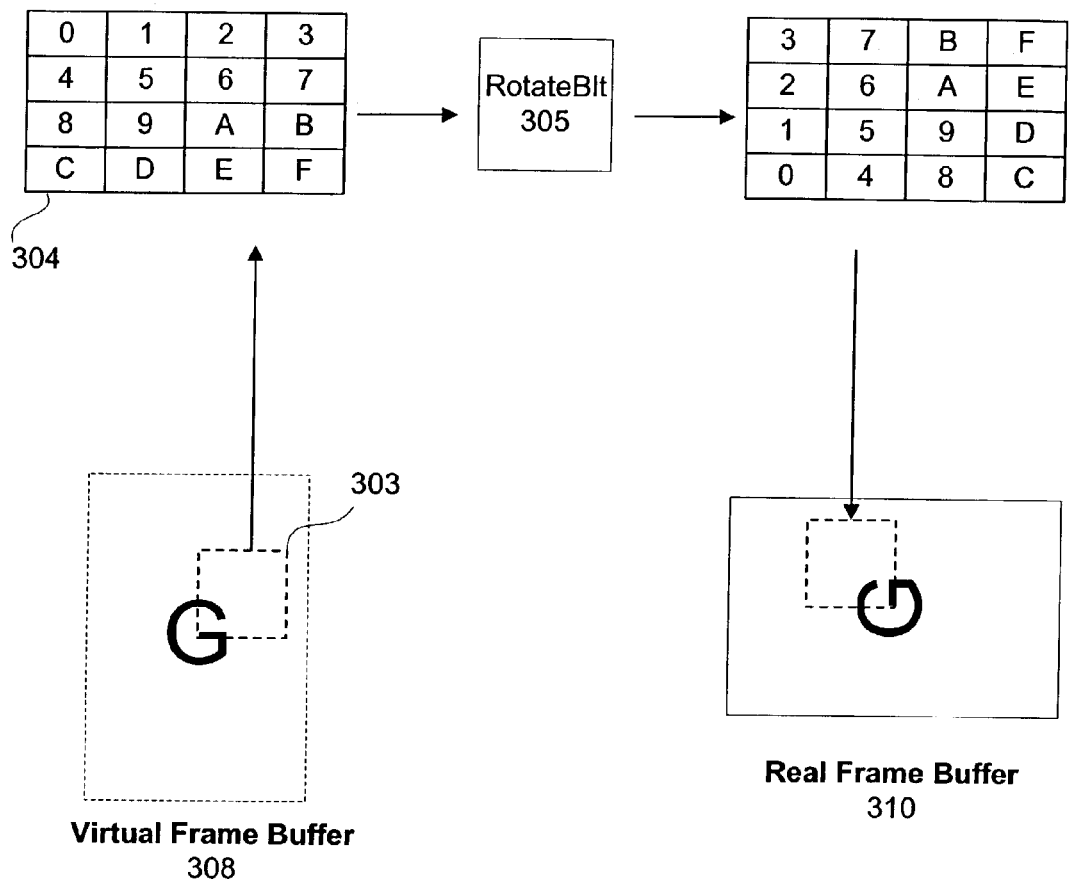
FIG. 3 illustrates an embodiment of software chunking.

FIG. 3 illustrates an embodiment of software chunking. In one embodiment, the rotation driver provides an optimization software dispatch mechanism that splits a region 303 of the VFB 308 into smaller sub-regions or "chunks" 304 for accelerated rotated rendering. This is also called "software chunking." In one embodiment, the optimized software chunking breaks down the region 303 into square chunks 304 to achieve cache-hits for all pixel look-ups during rotation into the RFB 310 by the rotation functionality 305. In one embodiment, the dimensions (i.e. height and width) of the squares or "chunks" 304 are selected based on the size of the cache and the color-depth of the source and/or the color depth of the destination surface, which may be different. In one embodiment, the size of each chunk is the size of the internal render and texture cache. As a result, the traffic consisting of intermediate read/writes from/to the cache is confined within the graphics system, since during rotation of a chunk, all pixel lookups may be satisfied within the internal graphics cache. This eliminates a major component of bandwidth between the graphics system and memory. In one embodiment, the chunks are aligned along memory tile boundaries for optimal memory page efficiency.

In one embodiment, a chunk 304 may be converted on the fly to a more efficient format as it is rotated and copied into the RFB 310 by the rotation functionality 305, such as the RotateBlt function. For example, in one embodiment, a chunk is converted from ARGB to more efficient RGB format. Examples of other formats for the contents of the RFB 310 are discussed above.

Figure 4A:
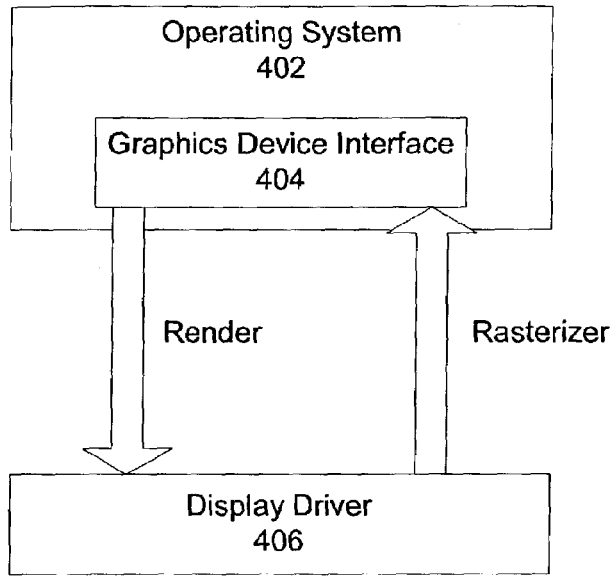
FIG. 4A illustrates an embodiment of a landscape mode graphics driver stack.
Figure 4B:
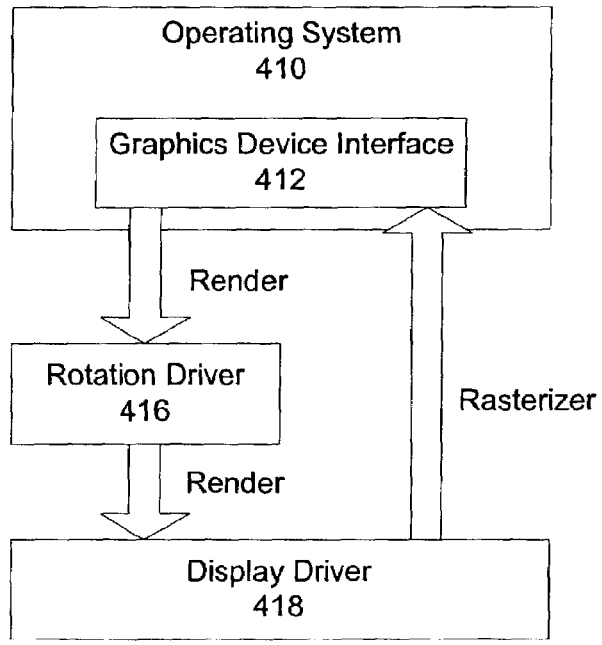
FIG. 4B illustrates an embodiment of a rotation mode graphics driver stack.

FIGS. 4A and 4B illustrate embodiments of driver stacks. Referring to FIG. 4A, an embodiment of a landscape mode graphics driver stack is shown. In one embodiment, a graphics device interface (GDI) 404 of an operating system 402 sends render calls to a graphics display driver 406 for rasterization. Rasterization converts rendered graphics primitives into pixel values and stores them in a frame buffer. An example of a suitable operating system is a Microsoft Windows® operating system, such as Windows® XP Windows® XP Tablet PC Edition, or Windows® 2000, among others.

Referring to FIG. 4B, an embodiment of a rotation mode graphics driver stack is illustrated. In one embodiment, rotation driver 416 software is compiled and linked as a dynamically loadable module that is loaded over a graphics driver stack when a rotated mode is selected. In one embodiment, the rotation driver 416 is a layered driver. When loaded, the rotation driver 416 is transparent to a display driver 418 as well as an operating system 410. From the display driver's 418 perspective, the display driver 418 still communicates with and is controlled by a GDI 412 of the operating system 410. From the perspective of the operating system 410, the operating system is still controlling the display driver 418. The rotation driver 416 receives render calls from the GDI 412 and passes the calls down to the display driver 418 for accelerated rendering into the VFB.

Figure 5:
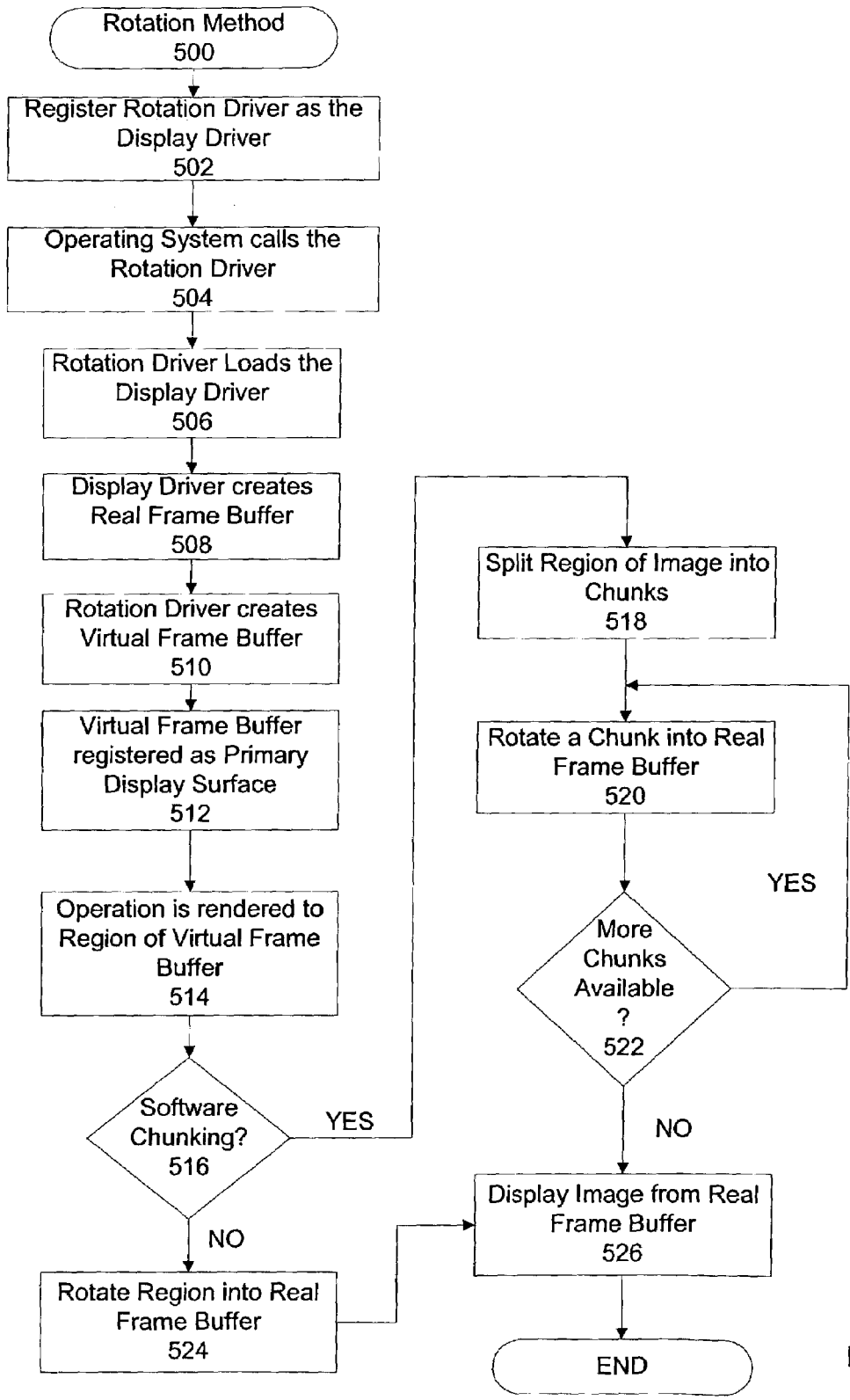
FIG. 5 illustrates a flow chart of an embodiment of a rotation method.

FIG. 5 illustrates a flow chart of an embodiment of a rotation method 500. In one embodiment, the rotation method 500 is implemented when a rotated mode is selected for display. At block 502, the rotation driver registers itself with the operating system as the display driver. At block 504, the operating system calls the rotation driver for accelerated rendering into the surfaces. On loading by the operating system, the rotation driver loads the display driver at block 506. From the display driver's perspective, the rotation driver is the graphics device interface of the operating system. At block 508, the display driver creates the RFB. At block 510, the rotation driver software creates the VFB. At block 512, the VFB is registered with the operating system as the primary display surface. In one embodiment, the rotation driver registers the VFB as the primary display surface. In one embodiment, the RFB is hidden from the operating system.

The operating system makes a call to the rotation driver for accelerating the rendering through hardware. At block 514, an operation is rendered to a region of the VFB. The VFB is the rendering target since it was registered as the primary display surface with the operating system. The rotation driver software makes use of the accelerated rendering of the display driver software, which causes the graphics hardware to render the image into VFB.

At block 516, a determination is made whether to use software chunking. In one embodiment, block 516 is skipped, and software chunking is automatically used. In another embodiment, block 516 is skipped and software chunking is not used. Where software chunking is not used, the method 500 rotates the rendered region from the VFB into the RFB at block 524. In one embodiment, a texture mapping engine is used by the display driver for rotating and rendering the region or image contents from the VFB into the RFB.

Where software chunking is used, the rendered region or image in the VFB is split into sub-regions or chunks at block 518. In one embodiment, the software chunking code is incorporated into the RotateBlt function. In one embodiment, the region is split into square chunks, so that all pixel look-ups for the rotation can score cache-hits within the square. In one embodiment, the size of the chunk depends on the size of the cache and the color depth. At block 520, a chunk is rotated from the VFB into the RFB in the appropriate orientation and location. In one embodiment, the chunk is rotated into a desired orientation, e.g. 90°, 180° or 270°. In one embodiment, the display driver uses a texture mapping engine for rotating and rendering a chunk from the VFB into the RFB. In one embodiment, a chunk is rotated into the RFB using 3D texture mapping engine instructions. In one embodiment, the display driver software uses the Texture Mapping instruction to rotate a chunk into the RFB.

At block 522, a determination is made as to whether more chunks are available. If more chunks are available, another chunk is rotated from the VFB into the RFB at block 520.

Once the region or image contents have been rotated from the VFB into the RFB, the scan logic of the graphics device scans the rotated image or affected region from the RFB and transmits it to the display device for display at block 526. Since the RFB is used as the source of the image to be displayed on the display device, the rotated image is perceived in a "right side up" orientation by a user on a rotated display.

In one embodiment, the rotation driver makes use of existing standard services of the display driver to provide support for rotated modes of display. For example, in one embodiment, the rotation driver makes use of mode enumeration. In one embodiment, when the operating system queries the display driver for the available modes and the resolution detail descriptions, the layered rotation driver passes this request to the actual display driver and appends the descriptor table with the rotated mode description list. For example, for each landscape mode reported by the display driver, the rotation driver adds three entries to the table for each orientation; e.g. 90°, 180° and 270°.

In one embodiment, the rotation driver makes use of the mode set operation. When the operating system issues a rotated mode set call to the rotation driver, mapping of this resolution is carried out in the rotation driver to the corresponding landscape mode that the display driver and the hardware is capable of setting. The modified request is passed down to the display driver and executed, resulting in a valid mode set with the new orientation. As part of the mode set operation, the VFB is created by the rotation driver and registered with the graphics device interface as the primary display surface.

In one embodiment, to maintain higher application compatibility and to optimize 3D engine usage to enhance the performance, only the rendering calls with primary display plane as the target surface are significant to the layered rotation driver. In one embodiment, rendering to the primary display plane surface occurs in two phases. In the first phase, all rendering calls from the graphics device interface of the operating system are passed down to the display driver for accelerated rendering into the VFB. In one embodiment, the display driver uses a graphics memory controller hub to render requested primitive drawing operations into the VFB. In the second phase, on completion of rendering to the VEB in an unrotated landscape mode by the display driver, control is returned back to the rotation driver. In one embodiment, the rotation driver makes use of the display driver's RotateBlt functionality to rotate the VFB image contents into the RFB. Subsequently, the rotated image contents of the RFB are scanned by the pixel scan logic of graphics memory controller hub to be transmitted to the attached display device.

Figure 6:
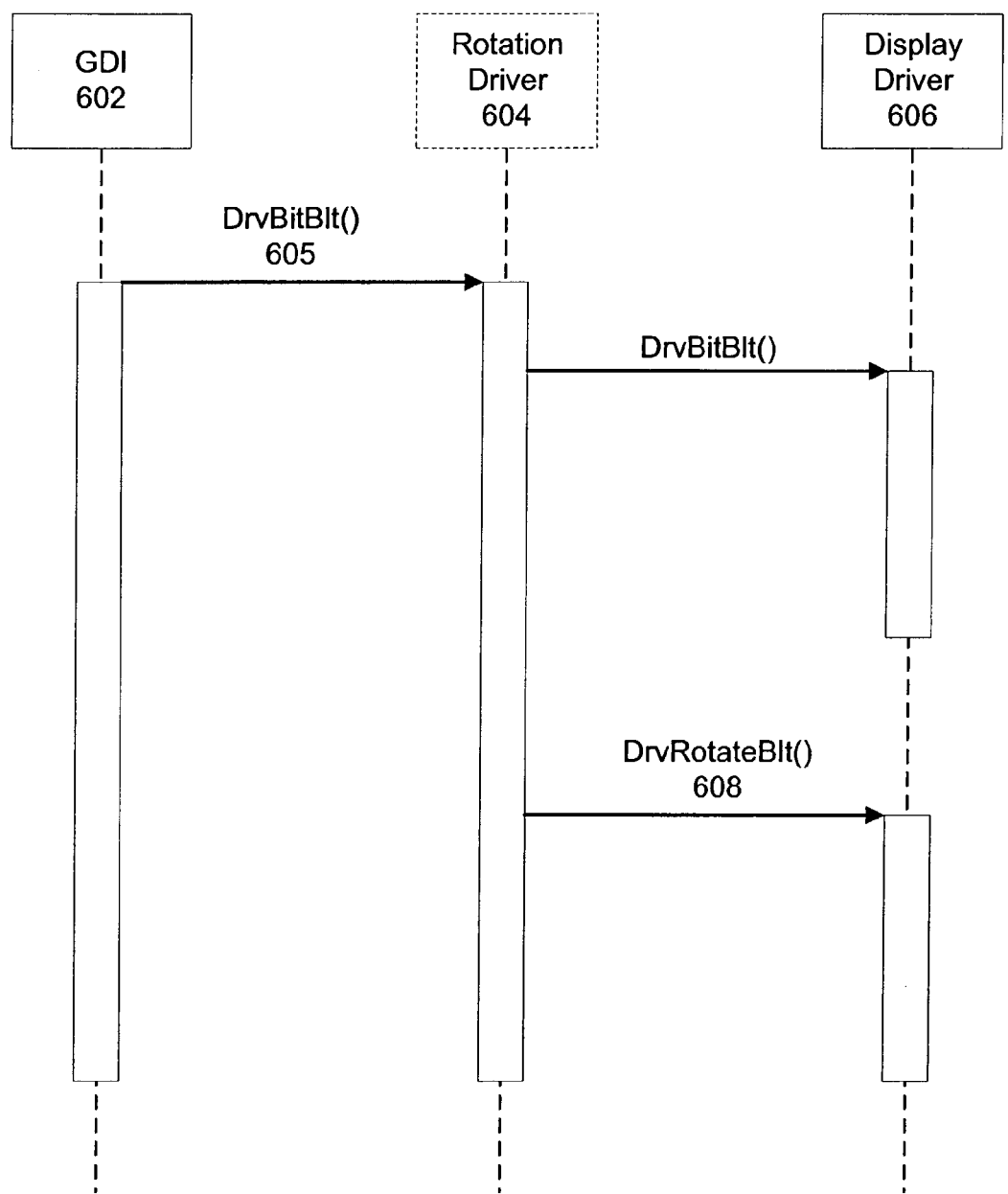
FIG. 6 illustrates an embodiment of rendering a rotated surface.

FIG. 6 illustrates an embodiment of rendering a rotated surface. The graphics device interface 602 of the operating system calls the rotation driver 604 to perform a render operation 605, e.g. DrvBitBlt( ). The layered rotation driver 604 passes the call to the display driver 606 to perform the operation 605 into the VFB. In one embodiment, the existing driver code pass is used by the rotation driver 604 to pass calls between the GDI 602 and the display driver 606. The display driver 606 then renders the operation 605 into the VFB. After the operation 605 has been rendered into the VFB, the rotation driver 604 performs an operation 608 to rotate the result of the render operation 605 from the VFB into the RFB in a rotated orientation. In one embodiment, the rotation driver 604 uses the RotateBlt operation 608 to rotate an affected area of the VFB into the RFB.

Figure 7:
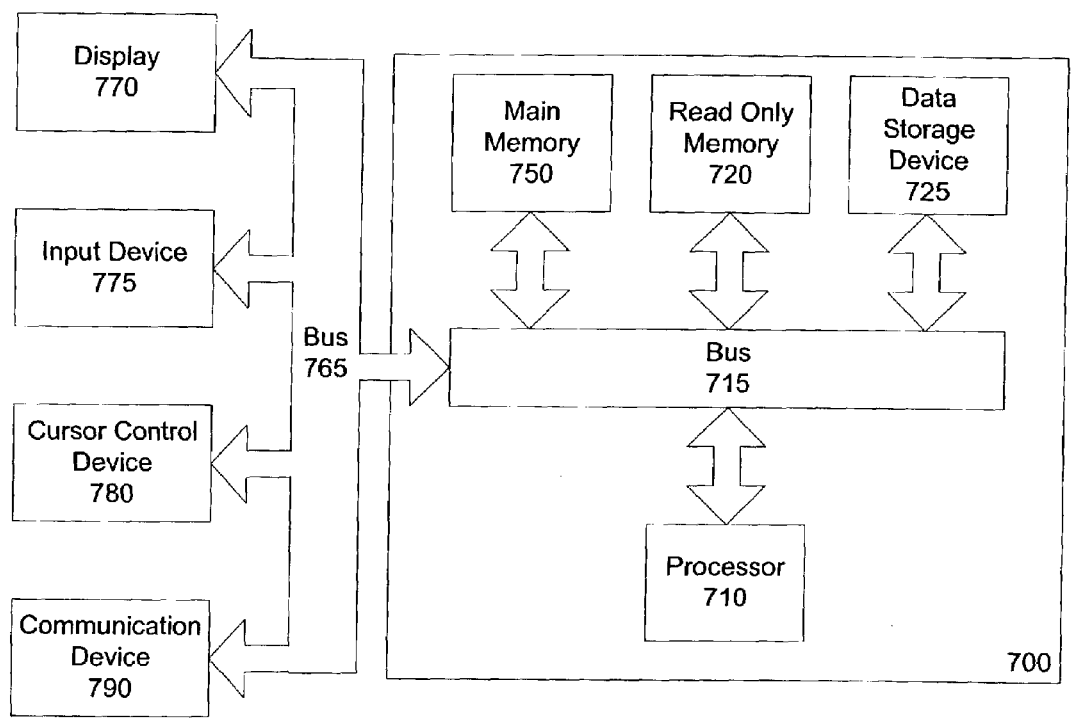
FIG. 7 illustrates an embodiment of a computer system that may be used with the present invention.

FIG. 7 is one embodiment of a computer system that may be used with embodiments of the present invention. It will be apparent to those of ordinary skill in the art, however that other alternative systems of various system architectures may also be used.

The data processing system 700 illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 may also be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system 700 may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, a wireless connection mechanism, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing embodiments of the present invention can be stored in main memory 750, mass storage device 725, or any machine-readable medium locally or remotely accessible to processor 710. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. In one embodiment, the present invention is implemented in a system including an integrated chipset which shares system memory, e.g. UMA (Unified Memory Architecture). The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The above description of illustrated embodiments of the invention, including what is described in the Abstract, is not intended to be exhaustive or to limit the invention to the precise forms or embodiments disclosed. While specific embodiments of, and examples for, the invention are described herein for illustrative purposes, various equivalent modifications are possible within the scope of the invention, as those skilled in the relevant art will recognize. These modifications can be made to embodiments of the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    loading a rotation driver, wherein the rotation driver is layered between a graphics device interface and a display driver, the display driver associated with a graphics controller, and wherein the rotation driver allocates a first memory space and the display driver allocates a second memory space;
    the rotation driver receiving a render call from the graphics device interface;
    the rotation driver passing the render call to the display driver;
    in response to the render call passed by the rotation driver, the display driver instructing the graphics controller to render an image into the first memory space allocated by the rotation driver, the image having a first orientation within the first memory space;
    the rotation driver rotating the image from the first memory space into the second memory space, the image having a second orientation within the second memory space; and
    displaying the image in the second orientation from the second memory space.

2. The method of claim 1, wherein the first orientation is a landscape orientation, and wherein the second orientation is selected from the group consisting of 90°, 180°, and 270° from the first orientation.

3. The method of claim 1, wherein rotating the image is performed by a bit block transfer functionality of the display driver.

4. The method of claim 1, further comprising:
    registering the rotation driver with an operating system as the display driver.

5. The method of claim 1, further comprising:
    compressing the image as it is rotated into the second memory space.

6. The method of claim 1, wherein a color depth of the image in the second memory space is lower than a color depth of the image in the first memory space.

7. The method of claim 1, further comprising:
    splitting the image into a plurality of chunks; and
    rotating each chunk into the second memory space.

8. The method of claim 7, wherein a size of each chunk is selected based on a size of an internal cache.

9. The method of claim 7, wherein the plurality of chunks are aligned along memory tile boundaries.

10. The method of claim 1, wherein the image is in a byte-swizzled format in the second memory space.

11. An article of manufacture comprising:
    a machine-readable medium having stored thereon instructions that when executed by a machine cause the machine to perform operations comprising:
    loading a rotation driver, wherein the rotation driver is layered between a graphics device interface and a display driver, the display driver associated with a graphics controller, and wherein the rotation driver allocates a first memory space and the display driver allocates a second memory space;
    the rotation driver receiving a render call from the graphics device interface;
    the rotation driver passing the render call to the display driver;
    in response to the render call passed by the rotation driver, the display driver instructing the graphics controller to render an image into the first memory space allocated by the rotation driver, the image having a first orientation within the first memory space;
    the rotation driver rotating the image from the first memory space into the second memory space, the image having a second orientation within the second memory space; and
    displaying the image in the second orientation from the second memory space.

12. The article of manufacture of claim 11, wherein the first orientation is a landscape orientation, and wherein the second orientation is selected from the group consisting of 90°, 180°, and 270° from the first orientation.

13. The article of manufacture of claim 11, wherein rotating the image is performed by a bit block transfer functionality of the display driver.

14. The article of manufacture of claim 11, wherein the machine-readable medium further includes instructions that cause the machine to perform operations comprising:
registering the rotation driver with an operating system as the display driver.

15. The article of manufacture of claim 11, wherein the machine-readable medium further includes instructions that cause the machine to perform operations comprising:
compressing the image as it is rotated into the second memory space.

16. The article of manufacture of claim 11, wherein a color depth of the image in the second memory space is lower than a color depth of the image in the first memory space.

17. The article of manufacture of claim 11, wherein the machine-readable medium further includes instructions that cause the machine to perform operations comprising:
splitting the image into a plurality of chunks; and
rotating each chunk into the second memory space.

18. The article of manufacture of claim 17, wherein a size of each chunk is selected based on a size of an internal cache.

19. The article of manufacture of claim 17, wherein the plurality of chunks are aligned along memory tile boundaries.

20. The article of manufacture of claim 11, wherein the image is in a byte-swizzled format in the second memory space.

21. A system comprising:
a rotation driver layered between a graphics device interface and a display driver, the rotation driver to pass a render call from the graphics device interface to the display driver;
a graphics controller associated with the display driver;
a virtual frame buffer created by the rotation driver;
a real frame buffer created by the display driver, the display driver to instruct the graphics controller to render an image into the virtual frame buffer in response to the render call passed by the rotation driver, the image having a first orientation within the virtual frame buffer;
wherein the display driver includes a bit block transfer function to rotate the image from the virtual frame buffer into the real frame buffer, the image having a second orientation within the real frame buffer; and
an integrated display device to display the image in the second orientation from the real frame buffer.

22. The system of claim 21, wherein the first orientation is a landscape orientation, and wherein the second orientation is selected from the group consisting of 90°, 180°, and 270° from the first orientation.

23. The system of claim 21, wherein the display driver comprises the bit block transfer function.

24. The system of claim 21, wherein the image is in a compressed format within the real frame buffer.

25. The system of claim 21, the bit block transfer function further to split the image into a plurality of chunks, and to rotate each chunk into the real frame buffer.

26. The system of claim 25, wherein a size of each chunk is the same as a size of an internal cache.

27. The system of claim 21, wherein the image is in a byte-swizzled format in the real frame buffer.

* * * * *

UNITED STATES PATENT AND TRADEMARK OFFICE
CERTIFICATE OF CORRECTION

PATENT NO. : 7,050,071 B2  Page 1 of 1
APPLICATION NO. : 10/452167
DATED : May 23, 2006
INVENTOR(S) : Wyatt et al.

It is certified that error appears in the above-identified patent and that said Letters Patent is hereby corrected as shown below:

In column 7, at line 32, delete "VEB" and insert --VFB--.

Signed and Sealed this

Sixth Day of January, 2009

JON W. DUDAS
*Director of the United States Patent and Trademark Office*